United States Patent
Vishik et al.

(10) Patent No.: US 7,461,084 B2
(45) Date of Patent: Dec. 2, 2008

(54) REGISTRY/REPOSITORY BASED PRIVATE MARKET GENERATOR

(75) Inventors: Claire S. Vishik, Austin, TX (US); Suresh K. Damodaran-Kamal, Coppell, TX (US)

(73) Assignees: AT&T Labs, Inc., Reno, NV (US); Sterling Commerce, Inc., Dublin, OH (US)

( * ) Notice: Subject to any disclaimer, the term of this patent is extended or adjusted under 35 U.S.C. 154(b) by 0 days.

(21) Appl. No.: 11/278,486

(22) Filed: Apr. 3, 2006

(65) Prior Publication Data

US 2006/0195333 A1 Aug. 31, 2006

Related U.S. Application Data

(63) Continuation of application No. 10/133,920, filed on Apr. 26, 2002, now Pat. No. 7,054,880.

(51) Int. Cl.
*G06F 17/30* (2006.01)

(52) U.S. Cl. .................. 707/102; 707/10; 707/204; 705/26; 705/35

(58) Field of Classification Search ............ 707/10, 707/100, 102, 200, 204; 705/1, 22, 16, 26, 705/28, 27, 37, 35, 39; 709/201; 715/234, 715/235
See application file for complete search history.

(56) References Cited

U.S. PATENT DOCUMENTS

| | | | | |
|---|---|---|---|---|
| 4,799,156 A | 1/1989 | Shavit et al. | ............. | 705/26 |
| 5,897,622 A | 4/1999 | Blinn et al. | ............. | 705/26 |
| 6,131,087 A | 10/2000 | Luke et al. | ............. | 705/26 |
| 6,151,601 A | 11/2000 | Papierniak et al. | ............. | 707/10 |
| 6,330,575 B1 | 12/2001 | Moore et al. | ............. | 707/513 |

(Continued)

FOREIGN PATENT DOCUMENTS

EP     1 146 465 A2    10/2001

(Continued)

OTHER PUBLICATIONS

Gehrke et al., Constructing Electronic Marketplaces Using Peer-To-Peer Technology, System Sciences, 2003. Proceedings of the 36th Annual Hawaii International Conference on, Jan. 6-9, 2003, pp. 10pp.*

*Primary Examiner*—Greta L Robinson
(74) *Attorney, Agent, or Firm*—Joseph P. Lally; Jackson Walker L.L.P.

(57) ABSTRACT

A method for creating an electronic marketplace includes receiving from a first client a request to create an electronic marketplace and receiving information about a product associated with the marketplace. The information includes at least one of first product information and a reference to second product information. The method also includes creating a marketplace metacatalog associated with the marketplace using a template, storing the first product information in the marketplace metacatalog if the information about the product includes the first product information, and associating the reference to the second product information with the marketplace metacatalog if the information about the product includes the reference. The method further includes communicating at least a portion of at least one of the first product information and the second product information to a second client using the marketplace metacatalog. In addition, the method includes facilitating completion of a transaction involving the second client using the marketplace metacatalog.

14 Claims, 5 Drawing Sheets

U.S. PATENT DOCUMENTS

| | | | |
|---|---|---|---|
| 6,345,239 B1 | 2/2002 | Bowman-Amuah | 703/6 |
| 6,345,278 B1 | 2/2002 | Hitchcock et al. | 707/100 |
| 6,484,149 B1 | 11/2002 | Jammes et al. | 705/26 |
| 6,850,900 B1 | 2/2005 | Hare et al. | 705/26 |
| 6,922,675 B1* | 7/2005 | Chatterjee et al. | 705/26 |
| 7,249,065 B2* | 7/2007 | Bliakhman et al. | 705/26 |
| 2001/0032170 A1* | 10/2001 | Sheth | 705/37 |
| 2003/0046201 A1* | 3/2003 | Cheyer | 705/35 |
| 2003/0088477 A1* | 5/2003 | Kobayashi et al. | 705/26 |
| 2003/0204449 A1* | 10/2003 | Kotas et al. | 705/27 |
| 2003/0236791 A1* | 12/2003 | Wilmsen et al. | 707/100 |

FOREIGN PATENT DOCUMENTS

| | | |
|---|---|---|
| WO | WO 01/33313 A2 | 5/2001 |
| WO | WO 01/69460 A1 | 9/2001 |
| WO | WO 01/77975 A1 | 10/2001 |

* cited by examiner

REGISTRY/REPOSITORY BASED PRIVATE MARKET GENERATOR

This application is a continuation of U.S. Ser. No. 10/133,920 now U.S. Pat. No. 7,054,880 B2 filed Apr. 26, 2002, the contents of which are hereby incorporated in its entirety by reference.

TECHNICAL FIELD

This invention relates generally to the field of electronic commerce, and more particularly to a system and method for creating electronic marketplaces.

BACKGROUND

Purchasing and other transactions routinely occur over the Internet in electronic marketplaces. Electronic marketplaces typically allow buyers to locate suitable sellers and sellers to locate suitable buyers. However, establishing and maintaining an electronic marketplace is often expensive and time-consuming. For example, an electronic marketplace is typically built to order, which often requires a large initial investment by the owner of the marketplace. It is also often difficult to integrate the electronic marketplace into existing applications and systems, such as back-end legacy systems. In addition, it is often difficult to attract a sufficient number of customers to use the electronic marketplace.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF EXAMPLE EMBODIMENTS

Figure 1:
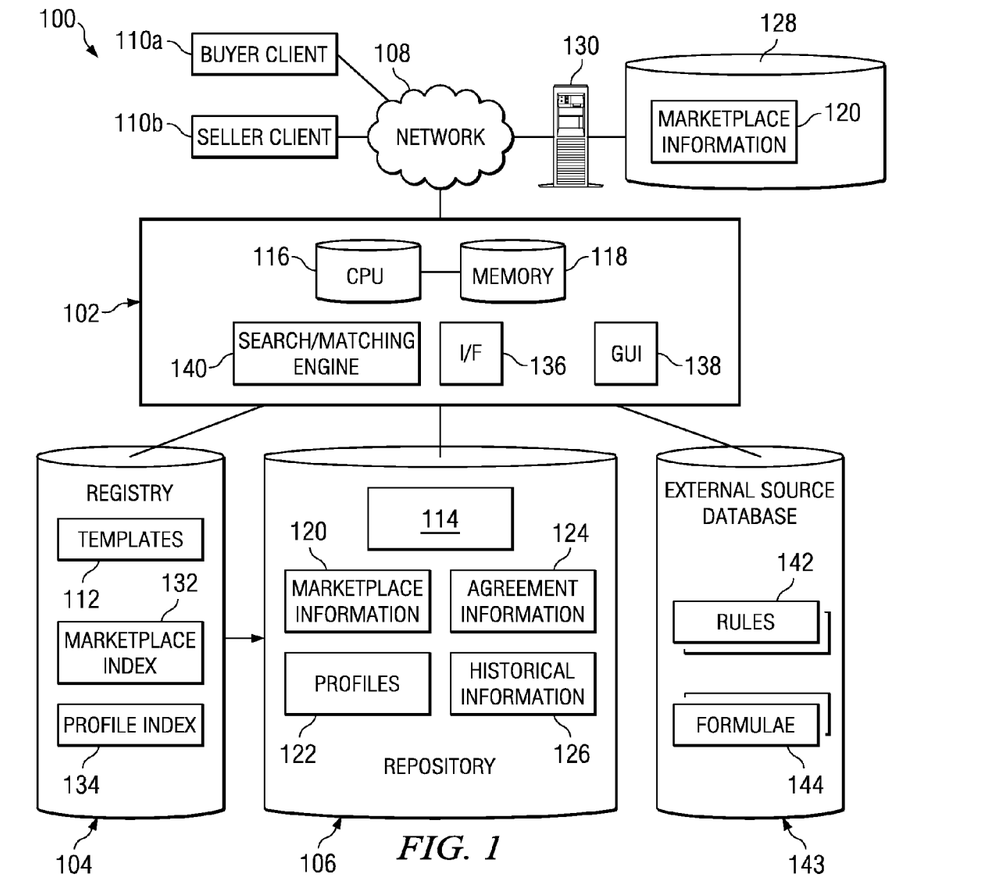
FIG. 1 is a block diagram illustrating an example system for creating and supporting an electronic marketplace.

FIG. 1 is a block diagram illustrating an example system 100 for creating and supporting an electronic marketplace. In the illustrated embodiment, system 100 includes a marketplace server 102, a registry 104, a repository 106, a network 108, and one or more clients 110a and 110b. Other embodiments of system 100 may be used without departing from the scope of this disclosure.

In one aspect of operation, server 102 supports the creation and operation of one or more electronic marketplaces. In this document, the term "marketplace" may refer to any suitable environment that supports or otherwise facilitates the occurrence of one or more transactions involving one or more products. Also, in this document, the term "product" may refer collectively to products, services, and/or other tangible or intangible items. In one embodiment, server 102 contains or otherwise has access to one or more templates 112, which server 102 may use to generate an electronic marketplace. Templates 112 may, for example, represent data structures used to create objects that store information associated with an electronic marketplace. As particular examples, the templates 112 may be used to create objects that store an identification of the products sold in the marketplace, a description of the products, and a price of the products. Server 102 may also include or otherwise have access to one or more generic or common components 114 of electronic marketplaces. Components 114 may, for example, include shopping carts and credit card payment mechanisms. Server 102 may use templates 112 and common components 114, along with other components of system 100, to generate and operate an electronic marketplace. This may allow server 102 to generate electronic marketplaces in a faster and more cost-efficient manner.

In another aspect of operation, server 102 may allow a participant in system 100, such as a buyer or a seller of a product, to search for other participants that might be interested in obtaining or supplying the product. For example, when server 102 creates a new electronic marketplace, server 102 may search for participants in system 100 that might be interested in obtaining the product offered in the new marketplace. Server 102 could then invite the identified participants to the new marketplace. In one embodiment, server 102 may first search for participants that are interested in the exact product offered in the new marketplace at the price charged in the new marketplace. If additional participants need to be invited, server 102 may then search for additional participants, such as participants interested in the same product at a different price and participants interested in similar products. This may help to attract a sufficient number of customers to an electronic marketplace, which may also help to increase the business done through the marketplace.

Server 102 is coupled to registry 104, repository 106, and network 108. In this document, the term "couple" may refer to any direct or indirect communication between two or more components, whether or not those components are in physical contact with one another. Also, the term "communication" may refer to communication between physically separate components or between components within a single physical unit. In one embodiment, server 102 is operable to create one or more electronic marketplaces in system 100. For example, server 102 could receive information identifying a product to be sold, a description of the product, and a price of the product, such as from a client 110. Server 102 could use this information to create a new marketplace. In another embodiment, server 102 is operable to search through information associated with participants in system 100 and identify which of the participants might be interested in joining a new marketplace. For example, server 102 could search for participants who are interested in obtaining a particular product within a given price range. Server 102 may include any hardware, software, firmware, or combination thereof operable to create an electronic marketplace and/or search for participants. Although this document may describe server 102 as possessing the functionality to both create electronic marketplaces and to perform searches, server 102 could implement only one of these functions without departing from the scope of this disclosure.

In one embodiment, server 102 may include one or more processors 116 and one or more memories 118. Processor 116 executes instructions and manipulates data to perform the operations of server 102. Although FIG. 1 illustrates a single processor 116 in server 102, multiple processors 116 may be used according to particular needs, and reference to processor 116 is meant to include multiple processors 116 where applicable. Memory 118 stores and facilitates retrieval of information used by processor 116 to perform the functions of server 102. Memory 118 may, for example, store instructions to be performed by processor 116 and data used by processor 116. Memory 118 may include any hardware, software, firmware, or combination thereof suitable to store and facilitate retrieval of information. Although FIG. 1 illustrates memory 118 as residing within server 102, memory 118 may reside at any location or locations accessible by processor 116. Also, this illustrates one example of how the functionality of server 102 may be implemented. In other embodiments, the functionality of server 102 could be implemented using logic stored in any suitable device or devices, such as a random access memory, a read-only memory, an application-specific integrated circuit (ASIC), or a field programmable gate array (FPGA).

Clients 110 are coupled to network 108. A client 110 may represent any suitable computing or communicating device through which a participant may access a marketplace. Client 110 could, for example, represent a desktop computer, a laptop computer, a server computer, a wireless device, a personal digital assistant, and/or any other suitable device. In a particular embodiment, a client 110 could represent an Enterprise Resource Planning (ERP) system used by a seller to accept purchase orders for products. In the illustrated embodiment, clients 110 have been divided into buyer clients 110*a* associated with participants wishing to purchase or otherwise obtain a product and seller clients 110*b* associated with participants wishing to sell or otherwise supply a product. This is for ease of illustration and explanation only. A single client 110 could, for example, represent one or more participants wishing to both obtain and supply one or more products.

Network 108 is coupled to server 102 and clients 110. Network 108 facilitates communication between components of system 100. Network 108 may, for example, communicate Internet Protocol (IP) packets, frame relay frames, Asynchronous Transfer Mode (ATM) cells, and/or other suitable information between network addresses. Network 108 may include one or more local area networks (LANs), metropolitan area networks (MANs), wide area networks (WANs), all or a portion of the global computer network known as the Internet, and/or any other communication system or systems at one or more locations.

In the illustrated embodiment, server 102 supports the creation of electronic marketplaces and/or the searching of information in system 100 using registry 104 and repository 106. In this example embodiment, repository 106 is coupled to server 102. In one embodiment, repository 106 stores information associated with one or more marketplaces. For example, repository 106 could include marketplace information 120. Marketplace information 120 could identify the products sold or otherwise made available in a marketplace, a description of the products, and the prices of the products. Marketplace information 120 could also identify processes used to support transactions in the marketplace, such as a pricing mechanism and/or a routing mechanism used to route requests. The pricing mechanism associated with a marketplace could identify whether the marketplace operates as a fixed price sale, an auction, a reverse auction, or a dynamic pricing enterprise.

In a particular embodiment, market information 120 may include a marketplace metacatalog, and the metacatalog may be associated with one or more catalog binders. In this document, the term "metacatalog" may refer to any object or other data structure operable to store information associated with a marketplace. Also, in this document, the term "binder" may refer to any object or other data structure operable to map or otherwise associate one or more products in a marketplace with information in an external, remote, or other location. In this embodiment, the marketplace metacatalog may identify the product or products available in the marketplace, an identifier associated with each product, a price or a price formula for each product, and a quantity of each product that is available. The information about the product could already be stored in repository 106, be stored in an external system such as a product catalog at client 110*a* and 110*b*, or represent new information. If the information about the product is new, the information could be inserted into the metacatalog. If the information about the product is already stored in repository 106, the metacatalog could include a pointer to that information. If the information about the product is already stored in an external or remote system, the metacatalog could include a pointer to a catalog binder. The catalog binder may then map or otherwise associate the product identified by the marketplace metacatalog with a remote or external catalog associated with the participant operating the marketplace. For example, if a computer monitor manufacturer wishes to operate a marketplace, server 102 could create a marketplace metacatalog identifying the various computer monitors to be sold through the marketplace. Server 102 may also create a catalog binder associating a monitor with the manufacturer's electronic catalog, such as a catalog operating at client 110. In this embodiment, if a customer later buys a monitor through the marketplace, the quantity of available monitors could be decremented in both the metacatalog and the manufacturer's catalog. In a particular embodiment, one binder is used for each product listed in the marketplace metacatalog. Marketplace information 120 could include any other and/or additional information about a marketplace.

Repository 106 could also store one or more common components 114 of electronic marketplaces. Components 114 may represent one or more components commonly used to make electronic marketplaces operate. For example, components 114 could include shopping cart objects used to track the products that participants may want to obtain. Components 114 could also include order form objects used to collect information from participants, such as the name, mailing address, billing address, and credit card information of a participant buying a product. Components 114 could further include rules for executing payment mechanisms used to verify payment, such as a credit card verification module. In addition, components 114 could include message routing mechanisms used to route messages such as orders to clients 110 and format translation maps used to translate the orders between different order formats and/or between different communication protocols. Other and/or additional components 114 could be used in system 100. In one embodiment, repository 106 is accessible via registry 104.

Repository 106 could further store one or more participant profiles 122. Participant profile 122 could include one or more fields identifying various information associated with a participant in system 100. As particular examples, participant profile 122 could include the name, address, and telephone number of a participant. Participant profile 122 could also include the type of industry in which the participant operates, payment information associated with the participant, and the communication protocols used by the participant when communicating over network 108. Participant profile 122 could include any other and/or additional information about a participant, such as the business processes used by the participant and/or a rating given to the participant by the operator of server 102 or other participants. In a particular embodiment, profiles 122 in repository 106 represent Collaboration Protocol Profiles (CPPs) defined by the Enterprise Business eXtensible Markup Language (ebXML) standard or any other relevant registry/repository technique or standard.

Repository 106 could also store trading agreement information 124. Trading agreement information 124 could represent an agreement involving two or more participants made before, during, and/or after a transaction. As a particular example, two participants may use two clients 110 that support a number of different transport protocols and security and payment mechanisms. In this example, trading agreement information 124 could identify the transport protocol, security mechanism, and payment mechanism that the participants have agreed to use during a transaction. If the two participants later enter into a transaction involving a marketplace in system 100, clients 110 may use the parameters stored in agreement information 124 to carry out the transaction (unless different rules are applied). Trading agreement information 124 may also include business rules and/or other logic operable to dynamically create trading agreements, although trading agreements can also be created manually without departing from the scope of this disclosure. Agreement information 124 could include any other and/or additional information agreed upon by two or more participants in system 100. In a particular embodiment, agreement information 124 in repository 106 represents one or more Collaboration Protocol Agreements (CPAs) defined by the ebXML standard or any other relevant standard.

In addition, repository 106 could store historical information 126. Historical information 126 may include information about prior transactions involving participants in system 100. For example, historical information 126 could identify the previous products bought and/or sold by a participant, the quantity of each product, the price of each product, the shipping options selected for each product, and the method and time of payment in prior transactions. Historical information 126 could also include or otherwise be associated with a ranking of a participant. For example, the operator of server 102 (the "intermediary") could rank a participant based on the participant's behavior during previous transactions, such as whether the participant made timely payments and/or timely deliveries during the previous transactions. This information could be accessible to the intermediary operating the electronic marketplace. In a particular embodiment, each participant in system 100 may have an associated transaction log storing historical information 126 for that participant, and the logs may or may not be fully available for the participants to access. Historical information 126 could include any other and/or additional information associated with prior transactions or derived from prior transactions, such as the ranking information. While FIG. 1 illustrates historical information 126 residing in repository 106, historical information 126 could be located in a separate database or other storage media.

Repository 106 could store any other and/or additional information without departing from the scope of this disclosure. Repository 106 may include any hardware, software, firmware, or combination thereof operable to store and facilitate retrieval of information. Repository 106 may also use any of a variety of data structures, arrangements, and/or compilations suitable to store and facilitate retrieval of information. Repository 106 could, for example, include a dynamic random access emory (DRAM), a static random access memory (SRAM), or any other suitable volatile or nonvolatile storage and retrieval device or combination of devices. As a particular example, repository 106 could store objects containing the marketplace information 120, participant profiles 122, agreement information 124, historical information 126, and/or other information. While FIG. 1 illustrates repository 106 coupled to server 102, repository 106 may reside in any location or locations accessible by server 102. Also, repository 106 could be omitted from system 100, and the information contained in repository 106 could be referenced in registry 104 and stored in other suitable location or locations. For example, marketplace information 120 could reside in an external system, such as in a database 128 of a web server 130 or in a client 110.

Registry 104 is coupled to server 102. In one embodiment, registry 104 acts as an index to repository 106 and/or other locations in system 100. For example, registry 104 could store at least one marketplace index 132. Marketplace index 132 may identify the location of the marketplace information 120 associated with a marketplace, such as a location in repository 106 or in database 128 of web server 130. Marketplace index 132 could also include one or more application program interfaces (APIs) leading to product catalogs, ERP system, and inventory systems in external systems, such as systems in or associated with clients 110. Marketplace index 132 can also contain information about any metacatalogs and catalog binders associated with a marketplace. Marketplace index 132 could further include pointers to web services for product catalogs and other information related to a marketplace.

Figure 4A:
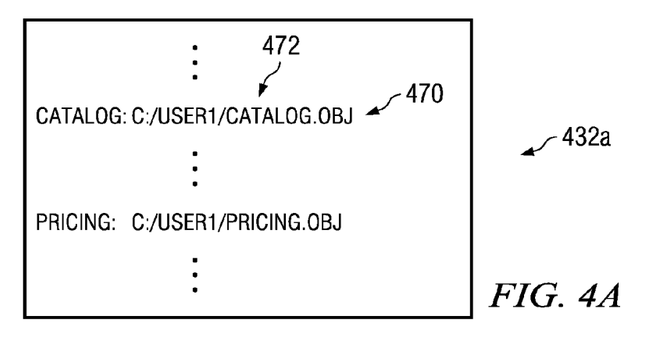
FIGS. 4A and 4B are block diagrams illustrating example configuration files.
Figure 4B:
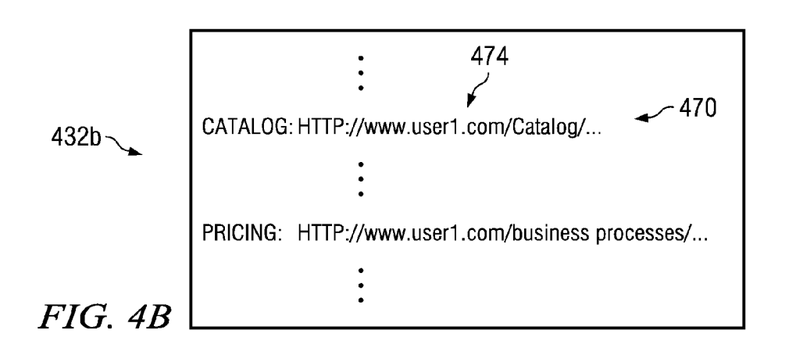

In a particular embodiment, market index 132 includes one or more configuration files for a marketplace. In this embodiment, the configuration file associated with a marketplace may identify the location of one or more objects or other data structures that contain information about the marketplace and/or that are necessary to make the marketplace operable. As an example, the configuration file could identify the location of a marketplace metacatalog that stores information about the products sold in the marketplace and catalog binders that bind the products to a participant's catalog. In addition, the configuration file could contain rules and/or other logic used to generate, operate, and/or retire the new electronic marketplace. For example, a rule could instruct server 102 to calculate prices for the products to be sold in the new marketplace by subtracting two percent from the prices listed in the participant's own catalog. After generating the marketplace, another rule could instruct server 102 to invite possible customers who have a ranking above a specified amount. Yet another rule could instruct server 102 to retire the marketplace if there is no activity at the marketplace for more than 24 hours on a business day. Example configuration files are shown in FIGS. 4A and 4B, which are described below.

Registry 104 could also store at least one participant profile index 134. Participant profile index 134 may, for example, identify the location of one or more participant profiles 122 in repository 106. In one embodiment, participant profile index 134 represents metadata associated with the participant profiles 122. Participant profile index 134 could include any other and/or additional information associated with participant profiles 122.

In addition, registry 104 could store one or more templates 112. In one embodiment, template 112 represents a data structure or other mechanism that server 102 can use to store information about a marketplace. For example, templates 112 may be used to store information such as the products to be offered in the marketplace, a description of the products, and a price of the products. In a particular embodiment, a template 112 could include a class that server 102 uses to create objects and/or formats and rules used to create the components in the marketplace. Server 102 could store information about a new marketplace in the objects and store them in repository 106, with references to them contained in registry 104. Server 102 could also use template 112 to support an input mechanism through which a participant may supply server 102 with the information to be stored in repository 106. For example, template 112 could identify the information needed to create a new marketplace, and server 102 could use this information to inform the participant of the needed information. The participant may then submit the information to server 102, and server 102 may store the information in repository 106. Other and/or additional templates 112 and types of templates 112 may be used in system 100.

Registry 104 could store any other and/or additional information without departing from the scope of this disclosure. Registry 104 could include any hardware, software, firmware, or combination thereof operable to store and facilitate retrieval of information using any of a variety of data structures, arrangements, and/or compilations.

The information stored in registry 104 and/or repository 106 could follow any suitable format or standard. In certain embodiments, the information stored in registry 104 and/or repository 106 may follow the Universal Description, Discovery and Integration (UDDI) standard, the Simple Object Access Protocol (SOAP) standard, the Web Services Description Language (WSDL) standard, the ebXML standard or any other relevant registry/repository standard. In a particular embodiment, the marketplaces supported by registry 104 and/or repository 106 may operate as web services or other software programs based on standard-based integration techniques. In another particular embodiment, server 102 may support a middleware layer that integrates into system 100 a legacy application that cannot function as a web service and/or that cannot be exposed as a web service for other reasons. Also, the division of information between registry 104 and repository 106 is for illustration only. Information illustrated as residing in one location in system 100 could reside in another location or locations in system 100. Further, while FIG. 1 illustrates registry 104 and repository 106 as being separate entities, the information stored in registry 104 and repository 106 could reside in a common physical medium. In addition, registry 104 and/or repository 106 could support public or private marketplaces.

Server 102 may include additional functionality. For example, server 102 may include one or more data import and/or data transformation interfaces (I/F) 136. Interface 136 allows a participant in system 100 to import information into registry 104, repository 106, or other suitable location. As an example, a participant may request that server 102 generate a new marketplace in system 100. Server 102 may create one or more objects or other data structures to hold the marketplace information 120 in repository 106. Server 102 could also receive information from the participant, create a configuration files based on the specifics of the request, and store the received information in the created objects. In one embodiment, the participant can use data import interface 136 to supply server 102 with the information needed to generate the new marketplace. Interface 136 may include any hardware, software, firmware, or combination thereof operable to receive information for use by server 102 in generating a new marketplace.

Server 102 could also include one or more graphical user interfaces (GUI) 138. Graphical user interface 138 may allow a participant in system 100 to initialize and set up a configuration file for a marketplace. For example, graphical user interface 138 may receive a request from a participant to create a new marketplace with particular parameters. Server 102 could create a new configuration file for the new marketplace referenced in marketplace index 132. Graphical user interface 138 could then allow the participant to assign values to the fields in the configuration file and submit rules used to generate the marketplace. For example, some fields in the configuration file may identify where various information used to create the new marketplace is located. As particular examples, the participant could identify the objects that describe the products to be sold in the marketplace, whether the objects reside in repository 106, database 128, client 110, or elsewhere, and the location of the identified objects could be inserted into the configuration file. Graphical user interface 138 may include any hardware, software, firmware, or combination thereof operable to allow a participant to initialize, set up, and/or maintain a configuration file for a marketplace.

Server 102 may further support one or more data mining or analysis functions. For example, in one embodiment, server 102 may analyze information about various marketplaces and inform participants of the results. As a particular example, server 102 could analyze the marketplace information 120 and historical information 126 to determine an average price or a lowest price charged for a particular product. Server 102 could also identify any participants that operate marketplaces selling the same product for a price higher than the average or lowest price. Server 102 could then inform those participants of the average or lowest price, which may allow the participant to set more reasonable prices for their products. In one embodiment, the data mining functionality is available as a service to participants, and participants may pay a fee to receive the service. In another embodiment, the data mining functionality may be available to any participant in system 100. Any other suitable data mining operations may be used in system 100.

In addition, server 102 may include a search and matching engine 140. In one embodiment, search engine 140 may search through information such as marketplace information 120, participant profiles 122, and historical information 126 to locate participants and/or marketplaces that satisfy or match a user's search criteria. For example, when a new marketplace is created, search engine 140 could search participant profiles 122 to identify any participants who might be interested in obtaining a product from the new marketplace. As another example, a participant may want to obtain a particular product, and search engine 140 could search marketplace information 120 and locate any marketplaces selling the desired product.

Search engine 140 could include any hardware, software, firmware, or combination thereof operable to search information. In one embodiment, search engine 140 includes a rule engine operable to use one or more rules 142 to perform the search. Rules 142 could represent knowledge used by the rule engine to perform searches. The rule engine could use rules 142 to perform searching and/or matching operations, such as when the rule engine uses rules 142 to attempt to match participant profiles 122 as described below. As a particular example, a rule 142 for a participant using buyer client 110 could state that selling clients 110 should support the same order format defined by the participant's profile 122 in order to do business with the participant. The rule engine may use this rule 142 to disqualify any seller clients 110 that do not support the identified order format. In another embodiment, search engine 140 includes a propositional satisfiability solver that uses propositional formulae 144 to perform searches. The propositional satisfiability solver could represent a Chaff solver or a Davis-Putnam solver. Other embodiments of search engine 140 could also be used.

Other rules 142 and/or propositional formulae 144 could be used in system 100. Rules 142 and/or propositional formulae 144 may be stored in any suitable location or locations in system 100. While FIG. 1 illustrates rules 142 and propositional formulae 144 residing in a database 143 coupled to server 102, rules 142 and/or propositional formulae 144 may reside in any location or locations accessible by server 102.

In one aspect of operation, a participant may submit a request to create a new marketplace. The request could, for example, identify the product to be sold, a price or price formula of the product, and a quantity of the product to be sold. The request could also include an identification of a catalog to be associated with the new marketplace, such as a catalog operated by a participant at a client 110. Although this document may describe server 102 as receiving the request from the participant and creating a new marketplace in response to the request, other embodiments may be used. For example, the participant could submit the request to the operator of server 102, and the operator of server 102 could instruct server 102 how to create the new marketplace.

To create a new marketplace, server 102 could use templates 112 and/or data import interface 136 to receive or otherwise identify information associated with the new marketplace. For example, a participant could communicate information about the new marketplace to server 102 for storage in repository 106. Server 102 could use templates 112 to generate one or more objects (such as one or more metacatalogs), store the information in the objects, store the objects in repository 106, and update market index 132 to reflect the location of the objects in repository 106. The participant could also inform server 102 that the information associated with the new marketplace is already stored in repository 106 or in an external system. For example, the participant could wish to sell a certain quantity of a product that is identified and described in the participant's catalog. Server 102 could allow the participant to identify the catalog and the product contained in the catalog. Server 102 could also create an object (such as a catalog binder) in repository 106 that binds the metacatalog to the identified catalog and the identified product, allowing changes to information about the product to be made in both the object associated with the new marketplace and in the catalog.

Server 102 could also invite participants in system 100 to join the new marketplace. For example, server 102 may search the participant profiles 122 in repository 106. In particular, server 102 could search for participants who have indicated that they would be interested in obtaining the same product offered in the new marketplace or a similar product. Server 102 could then invite the identified participants to the new marketplace. In a particular embodiment, if an identified participant accepts the invitation, server 102 could include information about the participant in the new marketplace. For example, server 102 could automatically register the identified participant in the new marketplace.

When a participant accesses the marketplace, server 102 can use one or more common components 114 to facilitate completion of a transaction. For example, server 102 could use a shopping cart to track the product or products that the participant has shown an interest in buying. Server 102 could also use an order form to collect information from a participant, such as to verify the products being ordered and the quantity of the products being ordered. Server 102 could further use a payment mechanism to verify a credit card payment, a message routing mechanism to route an order to the client 110 supplying the product to the participant, and a format translator to translate the order between different order formats and/or between different communication protocols. When the order is placed, server 102 could update the marketplace information 120, such as by reducing the quantity of the product that is available for other participants to buy. If an object in marketplace information 120 is bound to a catalog, server 102 could update both the object associated with the marketplace and the catalog bound to the object.

Server 102 may allow a marketplace to operate for a limited amount of time or an unlimited amount of time. In one embodiment, server 102 may retire a marketplace upon the occurrence of one or more actions. For example, server 102 could retire a marketplace after all quantities of the products have been sold. Server 102 could also retire a marketplace in response to a request from the participant operating the marketplace. In addition, server 102 could retire a marketplace by merging the marketplace with another marketplace. This may allow, for example, products being sold in the retired marketplace to be sold in the other marketplace. In a particular embodiment, server 102 may archive information about the marketplace before retiring the marketplace. In one embodiment, server 102 retires a marketplace by archiving any marketplace metacatalogs and catalog binders and then deleting these objects from repository 106.

Although FIG. 1 illustrates one example of a system 100 for creating and supporting one or more electronic marketplaces, various changes may be made to system 100 without departing from the scope of this disclosure. For example, the division of information in system 100 is for illustration only. Some or all of the information contained in registry 104, repository 106, and database 143 could be combined and/or further dividing according to particular needs. Also, while FIG. 1 illustrates a server 102 performing particular tasks, any suitable computing and/or communicating device could be used. Further, the functional divisions of server 102 are for illustration only. Various components of server 102 could be combined, added, or deleted according to particular needs. In addition, while FIG. 1 illustrates one example operational environment, other environments may be used without departing from the scope of this disclosure.

Figure 2:
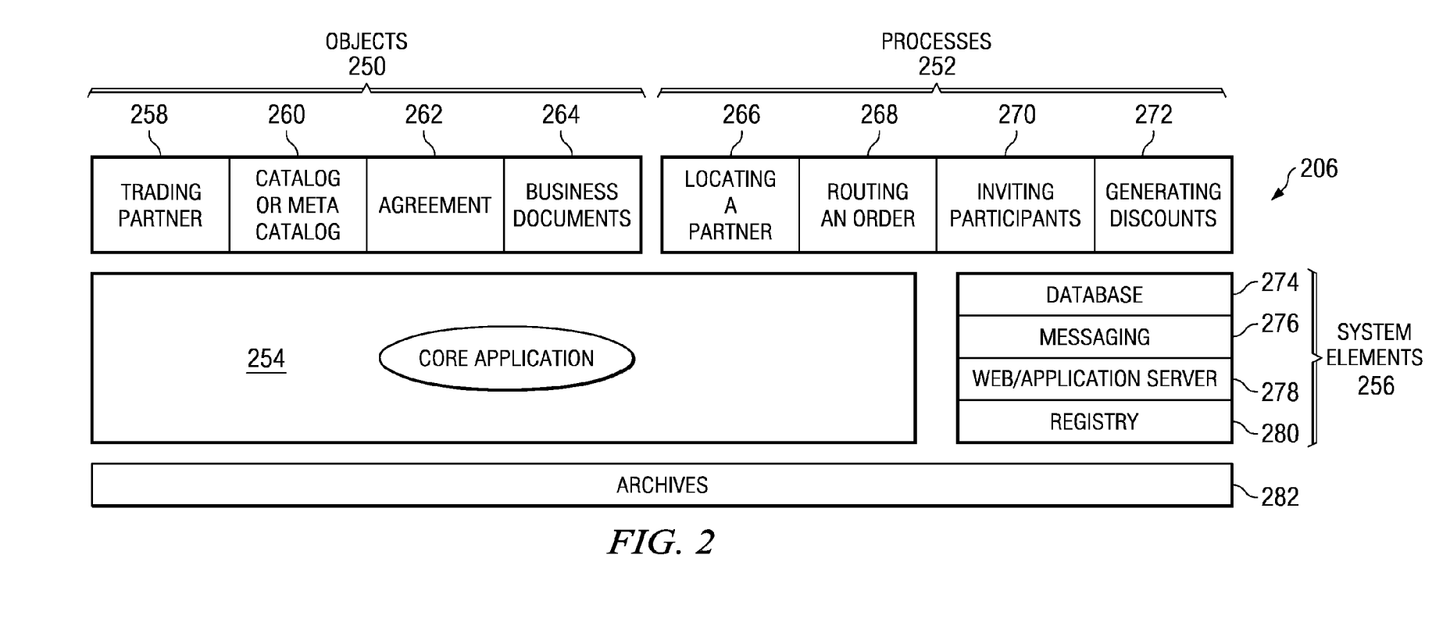
FIG. 2 is a block diagram illustrating an example system architecture for creating and supporting an electronic marketplace.

FIG. 2 is a block diagram illustrating an example system architecture for creating and supporting an electronic marketplace. In particular, FIG. 2 illustrates a portion of the contents of a repository 206, an application 254 that creates and supports marketplaces, and system elements 256 that support various components and functions in system 100. Repository 206 could be useful, for example, as repository 106 of system 100 of FIG. 1. The architecture illustrated in FIG. 2 is for illustration only. Other architectures may be used without departing from the scope of this disclosure.

In the illustrated example, repository 206 includes objects 250 and business processes 252. Objects 250 represent repository objects that store information associated with participants and marketplaces in system 100. For example, trading partner objects 258 may store information associated with trading partners, or participants, in system 100. As a particular example, the trading partner objects 258 could represent the participant profiles 122 described with respect to system 100 of FIG. 1. Trading partner objects 258 could store any other suitable information associated with participants in system 100.

Catalog objects 260 may store information associated with products offered in a marketplace. For example, catalog objects 260 could include an identification of the products, a classification of the products into different categories, a description of the products, and a price or price range for the products. As another example, catalog objects 260 could contain metadata or pointers to external or remote catalogs, such as catalogs in database 128 of web server 130 or in clients 110. In this example, catalog objects 260 could also include rules and instructions for retrieving information from the external or remote catalogs. As a particular example, catalog objects 260 could represent at least a portion of marketplace information 120 described with respect to system 100 of FIG. 1, such as the marketplace metacatalogs and the catalog binders.

Agreement objects 262 may store information associated with agreements between participants. For example, agreement objects 262 could store an agreement between two participants identifying the transport protocol and security mechanism that the participants agree to use during a transaction. Agreement objects 262 could also include contract terms used to allow participants in system 100 to enter into transactions. For example, agreement objects 262 could store the terms of a contract that a selling participant requires buying participants to agree to before the selling participant accepts orders from the buying participants. Agreement objects 262 could further include rules used to automatically generate contract terms. For example, agreement objects 262 could specify that a selling participant is willing to do business with a buying participant that wants to wait ninety days before paying for a purchase order, but only if the buying participant agrees to pay a five percent fee or has a particular credit rating. Agreement objects 262 could be used by one or more processes 252. As a particular example, agreement objects 262 could be used by a discount generation process 272 to automatically provide price discounts based on the prior transaction history of a buyer. In a particular embodiment, agreement objects 262 could represent at least a portion of agreement information 124 described with respect to system 100 of FIG. 1.

Business document objects 264 may store information defining how business may occur between participants in system 100. For example, business document objects 264 could store information identifying the format or formats of purchase orders that can be processed by a client 110 associated with a participant. Business document objects 264 could use rules and parameters to define the format of purchase orders, and the rules and parameters may be based on any suitable information including the catalog objects 260, the trading history of a participant, and the participant's profile 122. Business document objects 264 could also contain pointers to translation processes, which server 102 may use to convert purchase orders from one format to other formats. Business document objects 264 could further define acknowledgements, such as how the receipt of a purchase order may be acknowledged, as well as shipping documents defining how products are to be shipped. In addition, business documents 264 could identify the various steps used in a business process, such as by identifying that payment should occur only after a purchase order has been received at a seller client 110 and a shipment date has been established. Business document objects 264 could be used by one or more processes 252, such as an order routing process 268. As a particular example, business document objects 264 could represent at least a portion of agreement information 124 and participant profiles 122 described with respect to system 100 of FIG. 1.

As described above, server 102 may merge a first marketplace into a second marketplace. In this embodiment, server 102 could incorporate the catalog objects 260 associated with the first marketplace into the second marketplace. At that point, the second marketplace would be able to access and use the information about the products offered for sale in the first marketplace. The second marketplace could then use its own agreement objects 262 and business document objects 264 to enter into transactions.

Processes 252 represent various procedures or routines used to support transactions in system 100. The processes 252 could be implemented in repository 106 or in external or remote systems, such as in clients 110. For example, a partner location process 266 could be used to help a participant locate suitable trading partners in system 100. As a particular example, partner location process 266 could be used to identify potential customers when a new marketplace is created in system 100. Partner location process 266 could also be used to identify possible suppliers when a participant wishes to obtain a particular product. Other examples and uses of partner location process 266 could be supported in system 100.

An order routing process 268 could be used to support the communication of orders in system 100. For example, a participant may send a purchase order to server 102 indicating that the participant wishes to obtain a product from a particular seller client 110. Server 102 may use business document objects 264 to identify the proper format for the purchase order and reformat the purchase order if necessary. The order routing process 268 could describe how an order can be sent to a client 110. The order routing process 268 could also describe whether certain approvals are required before an order can be sent to a client 110. For example, order routing process 268 could require that transactions over a particular dollar amount be approved by the operator of server 102 before the transaction can be finalized.

Participant invitation process 270 could represent the process by which participants in system 100 may be invited to a marketplace, such as a new marketplace. Participant invitation process 270 may, for example, receive information identifying the participants in system 100 who might be interested in visiting a marketplace. Participant invitation process 270 could also generate an invitation, such as an electronic mail message, for the interested participants. In a particular embodiment, the invitation could offer a price break or discount if the participant visits the marketplace. Participant invitation process 270 could further verify the identity of participants entering a marketplace. For example, server 102 may support Secure Sockets Layer (SSL) transactions over secure connections, and verification could be based on a password or personal identification number (PIN) and a valid certificate. Participant invitation process 270 could also support biometrics verification, such as by using fingerprint recognition embedded in a keyboard, or using physical tokens such as smart cards.

Discount generation process 272 could represent a process by which discounts for a purchase order can be determined. For example, discount generation process 272 could allow participants with a prior purchasing history in a marketplace to receive a price break of two percent. Discount generation process 272 could also calculate discounts based on the volume of a product ordered. In another embodiment, discount generation process 272 could further include processes for calculating penalties for a purchase order, such as a penalty when a buyer has a poor credit rating.

Application 254 represents an application that supports electronic marketplaces in system 100 and allows participants to enter into transactions in the marketplaces. Application 254 could, for example, represent one or more software routines stored in memory 118 and executed by processor 116 of server 102. As a particular example, application 254 could represent routines used to create electronic marketplaces and/ or search for possible trading partners.

System elements 256 represent and support various components and operations in system 100. For example, database element 274 may represent databases used to store information in system 100. For example, database element 274 could represent database 143 and/or repository 106. Messaging element 276 may represent the communication mechanism to allow communication between various entities in system 100. For example, messaging element 276 could represent a messaging server that allows instant messaging between participants in system 100. As another example, messaging element 276 could represent a mail server that allows participants to communicate using electronic mail. Other communication techniques may be used in system 100. Web/application server element 278 may represent the various servers in system 100. For example, in FIG. 1, web/application server element 278 could represent server 102. In other embodiments, web/application server element 278 could represent multiple servers, such as an application server supporting the creation of electronic marketplaces and a web server facilitating access to the marketplaces. Registry element 280 may represent a registry in system 100. For example, registry element 280 could represent registry 106 of FIG. 1 and/or registry 206 of FIG. 2.

In one embodiment, system 100 may further include one or more archives 282. Archives 282 may store information about previous transactions that have occurred in system 100, information about marketplaces that have been retired in system 100, as well as any other and/or additional information.

Although FIG. 2 illustrates a portion of an example system architecture for creating and supporting an electronic marketplace, various changes may be made to FIG. 2 without departing from the scope of this disclosure. For example, the objects 250 and processes 252 illustrated in repository 206 could represent a subset of the objects and processes used to create and/or support electronic marketplaces. Other and/or additional objects 250 and processes 252 could be used in system 100. Also, other and/or additional system elements 256 could be supported in system 100.

Figure 3:
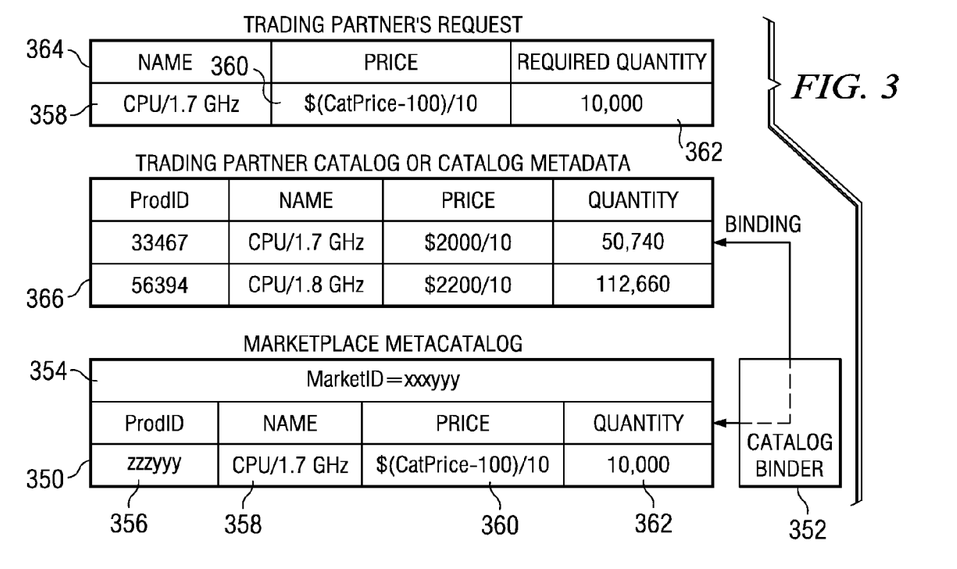
FIG. 3 is a block diagram illustrating an example marketplace metacatalog and catalog binder for creating an electronic marketplace.

FIG. 3 is a block diagram illustrating an example marketplace metacatalog 350 and catalog binder 352 for creating an electronic marketplace. In the illustrated example, metacatalog 350 includes a marketplace identifier 354, a product identifier 356, a product name 358, a price 360, and a quantity 362. Other embodiments of metacatalog 350 may be used without departing from the scope of this disclosure.

Marketplace identifier 354 represents a code used to identify the various marketplaces in system 100. In one embodiment, marketplace identifier 354 uniquely identifies each marketplace in system 100. Marketplace identifiers 354 may include numbers, alphanumeric strings, and/or any other suitable identifiers. Product identifiers 356 represent codes used to identify the various products offered through one or more marketplaces in system 100. In one embodiment, product identifiers 356 uniquely identify each product in system 100. Product identifiers 356 may include numbers, alphanumeric strings, and/or any other suitable identifiers. Product name 358 identifies the name and/or description of the product offered through a marketplace in system 100. Price 360 represents the price of the product offered through a marketplace in system 100. Price 360 could, for example, represent an exact price, a price range, or a price formula. Quantity 362 represents the quantity of the product that is available through the marketplace in system 100. In one embodiment, server 102 generates a metacatalog 350 using one or more templates, such as a template 112.

In a particular embodiment, server 102 creates metacatalog 350 in response to receiving a request 364. Request 364 may, for example, be generated by a participant using a client 110 and communicated to server 102 over network 108. In the illustrated embodiment, request 364 includes the product name 358, price 360, and quantity 362 contained in metacatalog 350. Other requests 364 could also be used in system 100.

In one embodiment, information about the product could already be stored in repository 106, be stored in an external system, or represent new information. If the information about the product is new, the information could be inserted into the metacatalog 350. If the information about the product is already stored in repository 106, the metacatalog 350 could include a pointer to that information. If the information about the product is already stored in an external or remote system, the metacatalog 350 could include a pointer to a catalog binder 352. Catalog binder 352 may then map or associate the marketplace metacatalog 350 with a remote or external catalog 366 associated with the participant operating the marketplace.

In the illustrated example, the request 364 indicates that a participant wishes to sell 10,000 processors having a speed of 1.7 gigahertz. The request 364 also indicates that ten processors cost one hundred dollars less than the catalog price for the processors, or $1900. Server 102 may use request 364 to generate a marketplace metacatalog 350, such as by using a template 112. Server 102 may also generate a product identifier 356 and insert the product identifier 356, the name 358 of the product, the price 360 of the product, and the quantity 362 of the product into the metacatalog 350. Server 102 may further store the metacatalog 350 in repository 106 and store the location of the metacatalog 350 in registry 104. In addition, in the illustrated example, the marketplace metacatalog 350 is associated with an external or remote catalog 366. As a result, server 102 may generate a catalog binder 352 that maps the product sold in marketplace to the external or remote catalog 366. Server 102 may also store the catalog binder 352 in repository 106 and the location of the catalog binder 352 in registry 104.

Although FIG. 3 illustrates an example marketplace metacatalog 350 and catalog binder 352 for creating an electronic marketplace, various changes may be made to FIG. 3 without departing from the scope of this disclosure. For example, a metacatalog 350 could be associated with any suitable number of catalog binders 352, such as zero, one, or multiple binders 352. As a particular example, one catalog binder 352 could be associated with each product identified in a metacatalog 352. Also, other and/or additional information could be included in a metacatalog 350, a binder 352, a request 364, and an external or remote catalog 366.

FIGS. 4A and 4B are block diagrams illustrating example configuration files. In particular, FIG. 4A illustrates a configuration file 432a identifying information stored in repository 106, and FIG. 4B illustrates an example configuration file 432b identifying information stored in an external system such as database 128 of web server 130 or client 110. In one embodiment, configuration files 432 may be stored in market index 132 of registry 104. The information contained in configuration files 432 is for illustration only. Other configuration files containing other information may be used without departing from the scope of this disclosure.

In FIG. 4A, configuration file 432a includes a plurality of fields 470. Each field 470 identifies a location 472 of information associated with a marketplace. For example, a "catalog" field 470 may include a location 472 of an object containing information about the products offered for sale in the marketplace. In a particular embodiment, the location 472 of the "catalog" field 470 identifies the location of a marketplace metacatalog and/or one or more catalog binders in repository 106. Similarly, a "pricing" field 470 may include a location 472 of an object defining the pricing process used to price a purchase order in the marketplace. In a particular embodiment, the "pricing" field 470 may include a location 472 of a discount generation process 272 in repository 106.

In FIG. 4B, configuration file 432b includes the same fields 470 as in FIG. 4A. In this example, each field 470 is associated with an external location 474. In this embodiment, information associated with a marketplace could reside outside of registry 104 and repository 106, such as in database 128 of web server 130 and/or in a client 110. In a particular embodiment, the configuration file associated with the marketplace could use external location 474 to identify the location of the information. In this embodiment, when server 102 receives a request from a client 110 to access a marketplace, server 102 may access the one or more external locations 474 identified by configuration file 432b. Server 102 may retrieve the information from the one or more external locations 474 and use that information as needed.

In another embodiment, a configuration file 432 could always include references 472 to repository 106 and not include any references to external locations 474. In this embodiment, objects in repository 106 could reference the external locations 474 of information associated with a marketplace. In this embodiment, server 102 may receive a request from a client 110 to access a marketplace. Server 102 may access the configuration file 432 in registry 104, identify the location of objects in repository 106 associated with the marketplace, access the objects, identify one or more external locations 474, and retrieve the information from the one or more external locations 474.

Although FIGS. 4A and 4B illustrate example configuration files 432 associated with electronic marketplaces, various changes may be made to FIGS. 4A and 4B without departing from the scope of this disclosure. For example, each configuration file 432 may include any suitable fields 470 and any suitable number of fields 470. Also, FIGS. 4A and 4B illustrate configuration files 432 as either including locations 472 in repository 106 or external locations 474. In other embodiments, a configuration file 432 could identify both information stored in repository 106 and information stored in an external location.

Figure 5:
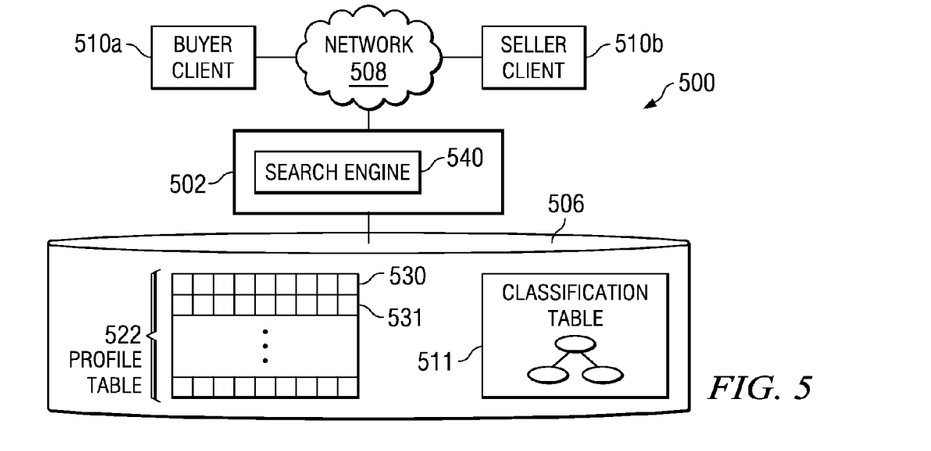
FIG. 5 is a block diagram illustrating an example system for matching profiles in an electronic marketplace.

FIG. 5 is a block diagram illustrating an example system 500 for matching profiles in an electronic marketplace. In the illustrated embodiment, system 500 includes a marketplace server 502, a repository 506, network 508, and one or more clients 510a and 510b. Other embodiments of system 500 may be used without departing from the scope of this disclosure.

In this example, server 502, repository 506, network 508, and clients 510a and 510b may be the same as or similar to server 102, repository 106, network 108, and clients 110, respectively, of FIG. 1. Also, in this example embodiment, repository 506 includes classification table 511 and profile table 522. Profile table 522 may include one or more profile records, including a requestor profile 530 and a trading partner profile 531. Profiles 530, 531 may be the same as or similar to participant profiles 122 of FIG. 1.

In one embodiment, each record in profile table 522 may include one or more key attributes or elements and one or more non-key attributes or elements. In this document, the phrase "key element" may refer to an attribute in a requestor profile 530 that is used to select at least one trading partner profile 531. For example, a key element could represent the transportation capabilities of the requesting buyer client 510a or seller client 510b. As a particular example, this key element could indicate that communication should occur using SSL. In this embodiment, system 500 could compare the value of the key element from requestor profile 530 to the value of the key element in one or more trading partner profiles 531.

Similarly, in this document, the phrase "non-key element" may refer to an attribute in a requestor profile 530 that is not used to select at least one trading partner profile 531. For example, a non-key element may represent a particular security mechanism. As a particular example, this non-key element could indicate that a client 510a or 510b could use 40-bit encryption.

Other examples of key elements and/or non-key elements may be used in system 500 without departing from the scope of this disclosure. Also, the division of key elements and non-key elements may be based on any suitable criteria. For example, the division could be based on rules 142 defined by a participant in system 500. In this example, a user using client 510a or 510b could define which attributes in requester profile 530 are key elements and which are non-key elements.

In the following description, requestor profile 530 may represent attributes of a buyer client 510a, and trading partner profiles 531 may each represent attributes of a seller client 510b. Other associations may be used in system 500 without departing from the scope of this disclosure.

One or more classification tables 511 may include records that provide an ontological representation of various attributes in profiles 530, 531. For example, one record may associate a SSL server value with a security mechanism attribute in a profile 530, 531. Another record may associate a 40-bit encryption value with the security mechanism attribute in the profile 530, 531. Further, each record may store a numeric value representing a logical distance from a related record. Using the earlier example, the security mechanism attribute in a profile 530, 531 may be represented by a security mechanism record that has two child records: secure server and encryption. The secure server parent may have a SSL server child record, and the encryption record may have two child records: 40-bit encryption and 128-bit encryption. For this example, assume that the numeric value associated with SSL server is 1.0. The classification table 511 may store the closer secure server record with a numeric value of 0.9 and the further security mechanism record with a value of 0.2.

In operation, buyer client 510a communicates a request to perform a commercial transaction to server 502 through network 508. Server 502 may retrieve the requester profile 530 from repository 506. System 500 may then retrieve none, some, or all of the remaining profiles 531, called trading partner profiles. System 500 could execute one or more heuristics, such as heuristics encoded as rules or propositional formulae, in an attempt to reduce the number of profiles 531 retrieved from repository 506. In one embodiment, system 500 may use the requestor's transaction history to reduce the number of trading partner profiles 531 retrieved. In another embodiment, system 500 may use the type of requested commercial transaction to reduce the number of trading partner profiles 531 retrieved. For example, if the buyer client 510a communicates a request to purchase computers, it is possible that requester profile 530 may only be matched to technology manufacturers' or distributors'profiles 531. Other heuristics may be used by system 500 without departing from the scope of this disclosure.

Search engine 540 processes the retrieved requester profile 530 and the retrieved trading partner profiles 531. In one embodiment, search engine 540 attempts to locate any trading partner profiles 531 that exactly match the requester profile 530. In this document, an "exact match" may occur when all or a substantial number of elements in requestor profile 530 have the same values as the corresponding elements in a trading partner profile 531. As a particular example, an exact match may occur when all of the key elements of the requestor profile 530 have the same value as the corresponding elements in a trading partner profile 531.

If no exact matches are found, search engine 140 may proceed to locate any partial matches. In this document, a "partial match" may occur when at least one element in requestor profile 530 has a different value than the corresponding element in a trading partner profile 531. As a particular example, a partial match may occur when at least one of the key elements of the requestor profile 530 has a different value than the corresponding element in a trading partner profile 531. In one embodiment, search engine 540 may use the classification tables 511 to score various partial matches. If no partial matches are found between requestor profile 530 and the trading partner profiles 531, a fail message may be communicated to buyer client 510a. In the event that requestor profile 530 is matched with example trading partner profiles 531, the matched trading partner profiles 531 could be communicated to the buyer client 510a through network 508 or used in any other suitable manner.

Figures 6, 7:
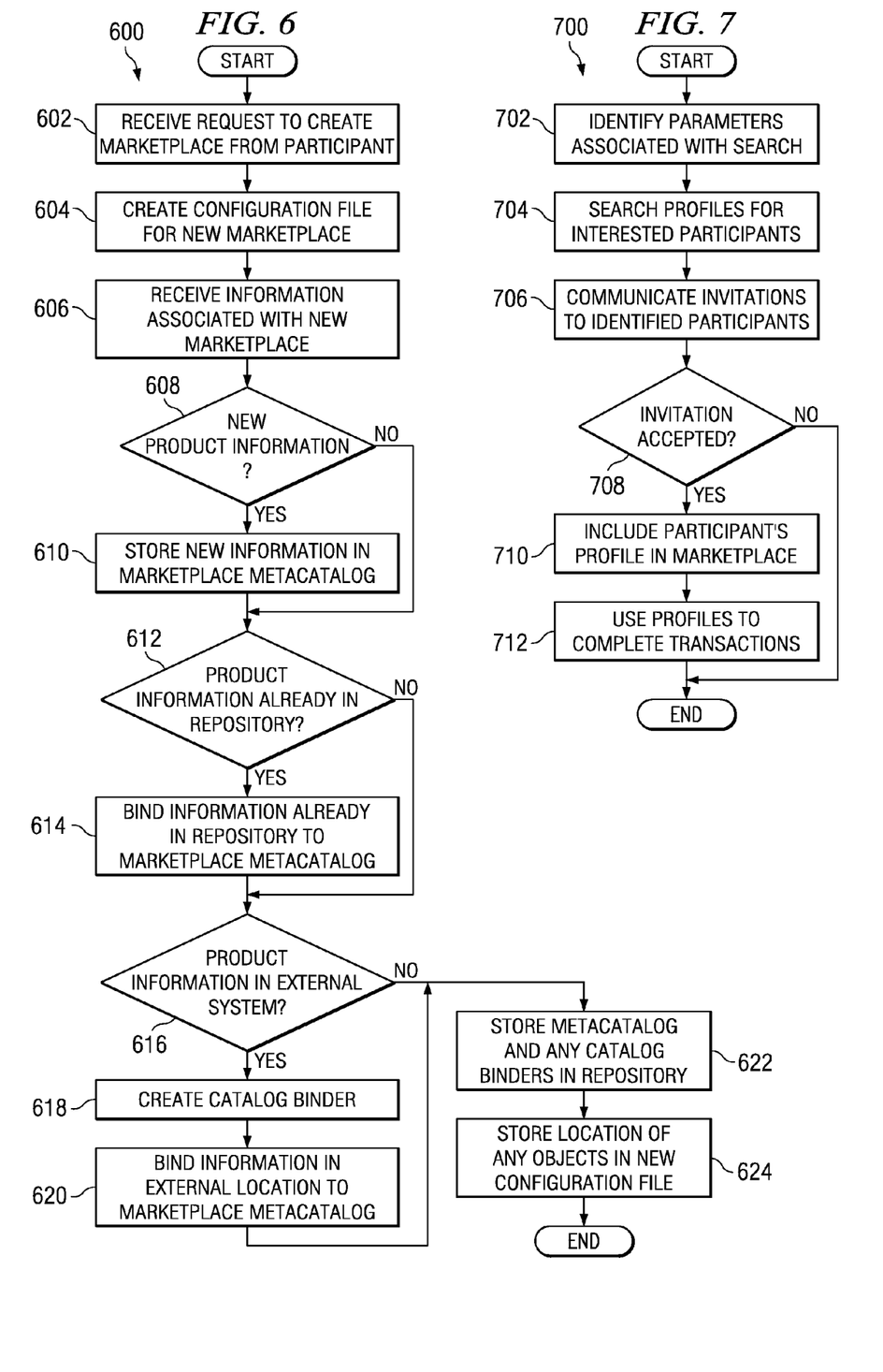
FIG. 6 is a flow diagram illustrating an example method for creating an electronic marketplace.
FIG. 7 is a flow diagram illustrating an example method for generating interest in an electronic marketplace.

FIG. 6 is a flow diagram illustrating an example method 600 for creating an electronic marketplace. Method 600 may be described with respect system 100 of FIG. 1. Any other suitable system may use method 600 to create an electronic marketplace without departing from the scope of this disclosure.

System 100 receives a request to create a new marketplace at step 602. This may include, for example, server 102 receiving the request from a client 110 over network 108. This may also include a participant using client 110 to access the graphical user interface 138 of server 102. Graphical user interface 138 may, for example, display a form to the participant using client 110, where the form allows the participant to enter and set up parameters for the new marketplace. System 100 creates a configuration file for the new marketplace at step 604. This may include, for example, server 102 creating an empty configuration file in market index 132 of registry 104.

System 100 receives information associated with the new marketplace at step 606. This may include, for example, server 102 receiving information from a client 110 over network 108. This may also include server 102 receiving the information using data import interface 136 or in any other suitable manner. The information may include information about the product or products to be offered for sale in the marketplace, the pricing mechanism to be used for the marketplace, and/or any other suitable information. The information may also include references to information already stored in repository 106 or in an external location.

System 100 determines whether at least some of the information associated with the new marketplace represents new information at step 608. New information may, for example, represent information not currently stored in repository 106 and/or a remote location. If at least some of the information associated with the new marketplace represents new information, server 102 may store the information in a marketplace metacatalog at step 610. This may include, for example, server 102 creating a marketplace metacatalog 350 using a template 112. This may also include server 102 storing the new information in the appropriate fields in the marketplace metacatalog 350.

System 100 also determines whether at least some of the information associated with the new marketplace already resides in repository 106 at step 612. This may include, for example, server 102 examining the information received at step 606 and determining whether that information includes a reference to repository 106. If at least some of the information associated with the new marketplace already resides in repository 106, system 100 may bind the information in repository 106 to the marketplace metacatalog at step 614. This could include, for example, server 102 storing the location 472 of the information in the new configuration file 432 or in the marketplace metacatalog 350.

System 100 may further determine whether any of the information associated with the new marketplace resides in an external system, such as in a database 128 of a web server 130 or in a client 110, at step 616. This may include, for example, server 102 examining the information received at step 606 and determining whether the information includes a reference to the external system. If at least some of the information associated with the new marketplace resides in an external system, system 100 may create a catalog binder at step 618. This may include, for example, server 102 creating a catalog binder 352 using a template 112. System 100 may bind the information in the external location to the marketplace metacatalog at step 620. This could include, for example, using the catalog binder 352 to associate the product in the metacatalog with the external or remote location. In another embodiment, server 102 could store the external location 474 of the information in the new configuration file 432.

System 100 stores the marketplace metacatalog and any catalog binders in repository 106 at step 622. System 100 could also store the marketplace metacatalog and/or catalog binders in any other suitable location or locations. System 100 stores the location of the marketplace metacatalog and any catalog binders in the new configuration file at step 624. This may include, for example, server 102 storing the location 472 of the marketplace metacatalog and catalog binders in a configuration file 432 residing in registry 104.

At this point, the new marketplace is available, and one or more participants may visit the marketplace and enter into a transaction. System 100 may take any other suitable actions to facilitate the operation and maintenance of the new marketplace. For example, server 102 could search one or more participant profiles 122 in repository 106 and attempt to locate participants in system 100 who may have an interest in the products offered for sale in the new marketplace. Server 102 could also communicate invitations to any identified participants, inviting those participants to join the new marketplace. Server 102 could also retire the new marketplace, such as when all of the products associated with the new marketplace have been sold or the new marketplace is to be merged with yet another marketplace.

Although FIG. 6 illustrates one example of a method 600 for creating an electronic marketplace, various changes may be made to method 600 without departing from the scope of this disclosure. For example, system 100 could receive information associated with the new marketplace before creating a configuration file for the new marketplace. Also, while FIG. 6 illustrates three decisional steps 608, 612, 616, other and/or additional decisional steps may be used in method 600. Further, the order of decisional steps 608, 612, 616, is for illustration only.

FIG. 7 is a flow diagram illustrating an example method 700 for generating interest in an electronic marketplace. Method 700 may be described with respect to system 100 of FIG. 1. Any other suitable system may use method 700 without departing from the scope of this disclosure.

Figure 8:
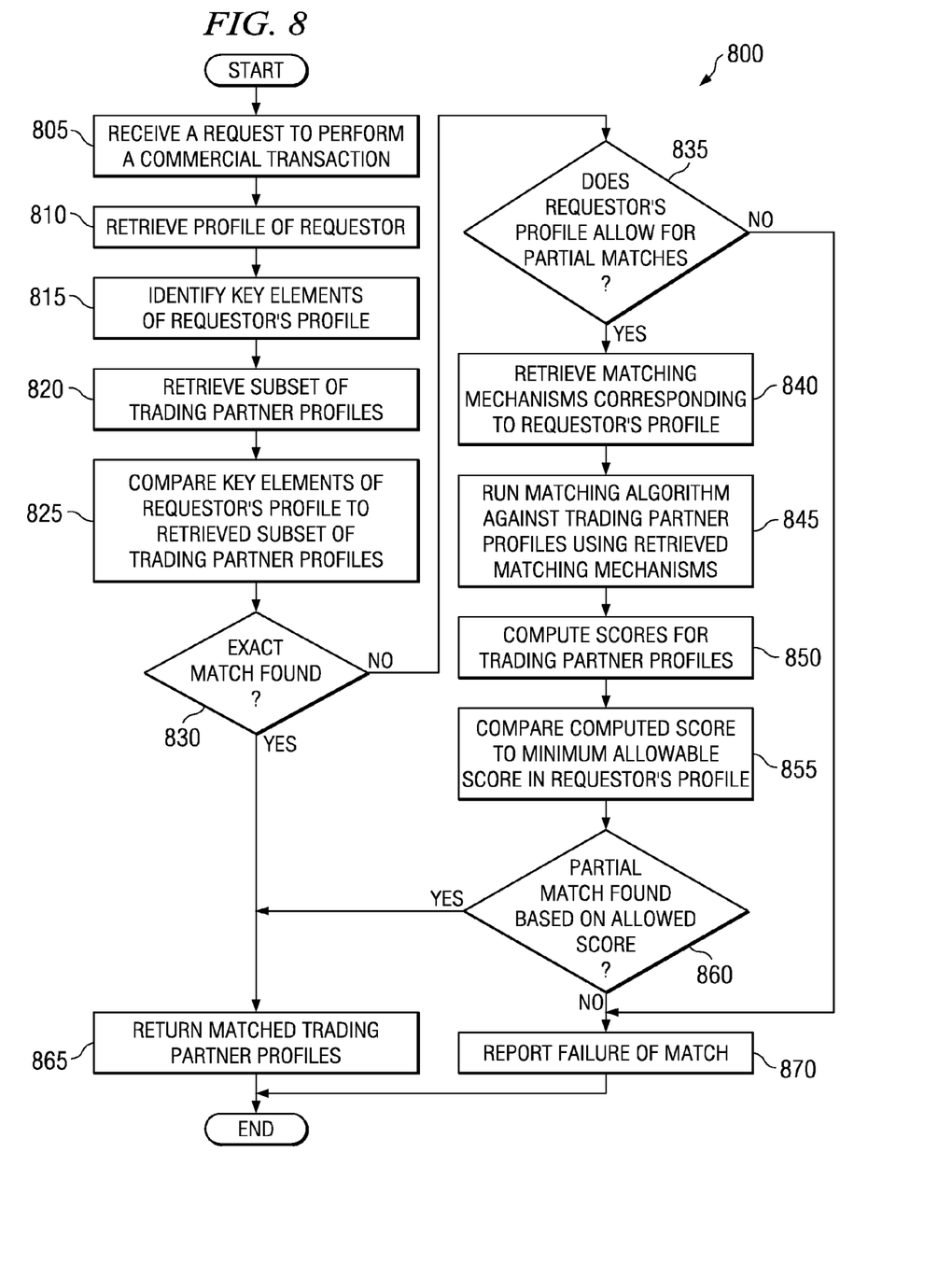
FIG. 8 is a flow diagram illustrating an example method for matching user profiles in an electronic marketplace.

System 100 identifies one or more parameters associated with a search at step 702. The parameters may, for example, represent information associated with a new marketplace, such as an identification of the product being sold, the price or price range of the product being sold, and the participant operating the marketplace. System 100 searches the participant profiles 122 for interested participants at step 704. This may include, for example, server 102 accessing participant profiles 122 in repository 106 using participant profile index 134. In this embodiment, participants in system 100 may indicate their interest in particular products using their participant profiles 122. For example, a participant may indicate an interest in obtaining a particular product when that product is sold at a given price or within a given price range. One example of a method for searching participant profiles 122 is shown in FIG. 8, which is described below.

System 100 communicates invitations to the identified participants at step 706. This may include, for example, server 102 communicating the invitations to the identified participants over network 108. As a particular example, server 102 could communicate the invitations to the identified participants using instant messaging and/or electronic mail.

System 100 determines whether any of the invitations are accepted at step 708. This may include, for example, server 102 determining whether any of the identified participants attempted to access the new marketplace. If one or more of the participants accepted the invitation, system 100 may include those participants' profiles 122 in the new marketplace at step 710. This may include, for example, serve 102 linking the trading partner objects 258 associated with each participant that accepts the invitation and the new marketplace.

At this point, server 102 may take any other suitable actions to generate interest in and/or facilitate completion of transactions in the new marketplace. For example, server 102 could use the participant profiles 122 of the interested participants to complete transactions at step 712. This may include, for example, server 102 using the trading partner objects 258 to identify billing information and shipping information associated with a participant who orders a product in the new marketplace. This may also include server 102 using the characteristics of the participant contained in trading partner object 258 to generate contract terms for a transaction.

Although FIG. 7 illustrates one example of a method 700 for generating interest in an electronic marketplace, various changes may be made to method 700 without departing from the scope of this disclosure. For example, server 102 could perform multiple searches of participant profiles 122 to identify interested participants. As a particular example, server 102 could search participant profiles 122 and identify participants who are interested in obtaining the exact product offered in the new marketplace at the price specified in the new marketplace. If an inadequate number of participants are identified or accept an invitation to the new marketplace, server 102 could perform another search of participant profiles 122. In the next search, server 102 could identify participants interested in related products and/or participants interested in this product at a different price. In addition, server 102 could search additional information to identify interested participants and is not limited to searching participant profiles 122. For example, server 102 could search historical information 126 to identify participants who have obtained the same or similar products during previous transactions in system 100.

FIG. 8 is a flow diagram illustrating an example method 800 for matching user profiles in an electronic marketplace. Although method 800 may be described with respect to system 100 of FIG. 1, method 800 may be used by any other suitable system without departing from the scope of this disclosure.

System 100 receives a request to create a marketplace at step 805. This may include, for example, server 102 receiving a request to create a marketplace over network 108 from a buyer or seller client 110. System 100 retrieves a profile 122 associated with the requestor at step 810. This may include, for example, server 102 identifying the requesting participant and retrieving the identified participant's profile 122 from repository 106.

System 100 identifies one or more key elements of the requestor's profile 122 at step 815. This may include, for example, server 102 identifying a predefined subset of elements in profile 122. In a particular embodiment, the requester may specify which elements to use in the search by defining one or more rules 142 in database 143. System 100 retrieves a subset of the trading partner profiles at step 820. This may include, for example, server 102 identifying a subset of the participant profiles 122 contained in repository 106. This may also include server 102 using one or more heuristics to identify the subset of profiles 122 retrieved from repository 106. The heuristics could be based on any suitable criteria. One heuristic could be based on the transaction history of a buyer participant, such as what types of products the participant has bought, sold, or examined. Another heuristic could be based on the types of businesses that a participant is interested in, such as whether the participant is more interested in computer products or automotive products. In a particular embodiment, server 102 could use the key element or elements identified at step 815 to select a subset of the profiles 122.

Server 102 compares the key elements of the requestor's profile 122 to the key elements of the retrieved subset of profiles 122 at step 825. If an exact match is found, system 100 returns the matching profiles 122 at step 865. This may include, for example, server 102 using the identity of the matching profiles 122 to generate invitations to the marketplace and to communicate the invitations to the participants associated with the matching profiles 122.

If no exact matches are found, system 100 determines if the requestor's profile 122 allows for partial matches at step 835. If not, system 100 reports the failure of the match at step 870. This may include, for example, server 102 informing the requestor that no matches were found. Otherwise, system 100 retrieves matching mechanisms corresponding to the requestor's profile 122 at step 840. This may include, for example, server 102 requesting the matching mechanisms from database 143. In one embodiment, the matching mechanisms may include rules 142. In another embodiment, the matching mechanisms may include propositional formulae 144.

System 100 runs a matching algorithm against the subset of profiles 122 using the retrieved matching mechanisms at step 845. This may include, for example, search engine 140 using the retrieved rules 142 or propositional formulae 144 to execute the matching algorithm. System 100 computes scores for the profiles 122 at step 850. In one embodiment, weights may be assigned to rules 142 or propositional formulae 144. For example, a rule 142 may analyze the security mechanism of each trading partner. In this example, an exact match of the security mechanism between the requestor and the profile 122 might give a score of ten, whereas a partial match might contribute a score of eight. In another embodiment, system 100 may maintain a running score. The running score may be the highest score computed thus far.

System 100 compares the computed scores to a minimum allowable score in the requestor's profile 122 at step 855. In one embodiment, search engine 140 of server 102 may compare the running scores to the minimum allowable score in the requestor's profile 122. System 100 determines whether any of the computed or running scores satisfies the allowable score at step 860. If so, system 100 returns the matching profile or profiles 122 at step 865. Otherwise, system 100 reports a failure at step 870.

Although FIG. 8 illustrates one example of a method 800 for matching user profiles in an electronic marketplace, various changes may be made to method 800 without departing from the scope of this disclosure. For example, system 100 could perform additional searches. As a particular example, the search for exact and partial matches could fail to locate an adequate number of profiles 122. Server 102 could then search historical information 126 and identify any participants who entered into transactions involving the same or similar products in the past.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A method for creating an electronic marketplace, comprising:
   receiving from a first client a request to create an electronic marketplace;
   creating a marketplace metacatalog associated with the electronic marketplace using a template;
   associating product information with the marketplace metacatalog, the product information comprising information regarding a product associated with the electronic marketplace;
   receiving data comprising at least one of the product information and a reference to the product information stored external to the marketplace metacatalog; and
   facilitating completion of a transaction involving a second client using the marketplace metacatalog;
   wherein:
      associating the product information with the marketplace metacatalog comprises:
         if the received data comprises the product information, storing the received product information in the marketplace metacatalog; and
         if the received data comprises a reference to the product information stored external to the marketplace metacatalog, storing the reference to the product information in the marketplace metacatalog;
      the product information is stored external to the marketplace metacatalog; and
      associating the product information with the marketplace metacatalog comprises:
         creating a catalog binder;
         storing a reference to the externally stored product information in the catalog binder; and
         storing a reference to the catalog binder in the marketplace metacatalog.

2. A method for creating an electronic marketplace, comprising:
   receiving from a first client a request to create an electronic marketplace;
   creating a marketplace metacatalog associated with the electronic marketplace using a template;
   associating product information with the marketplace metacatalog, the product information comprising information regarding a product associated with the electronic marketplace;
   receiving data comprising at least one of the product information and a reference to the product information stored external to the marketplace metacatalog; and
   facilitating completion of a transaction involving a second client using the marketplace metacatalog;
   retiring the electronic marketplace, including:
      copying the marketplace metacatalog and any catalog binders associated with the marketplace metacatalog to a second marketplace; and
      archiving the marketplace metacatalog, the any catalog binders, and any transactions that occurred through the electronic marketplaces;
   wherein associating the product information with the marketplace metacatalog comprises:
      if the received data comprises the product information, storing the received product information in the marketplace metacatalog; and
      if the received data comprises a reference to the product information stored external to the marketplace metacatalog, storing the reference to the product information in the marketplace metacatalog.

3. A method according to claim 2, further comprising communicating at least a portion of the product information to the second client using the marketplace metacatalog.

4. A method according to claim 2, wherein the product information comprises at least one of a unique product identifier, a name of the product, a description of the product, a price of the product, a price range of the product, and a price formula for the product.

5. A method according to claim 2, wherein the request to create the electronic marketplace includes the product information.

6. A system for creating an electronic marketplace, the system comprising at least one computer-readable medium including computer-executable instructions, the computer-executable instructions comprising:
   instructions for receiving from a first client a request to create an electronic marketplace;
   instructions for creating a marketplace metacatalog associated with the electronic marketplace using a template;
   instructions for associating product information, stored external to the marketplace metacatalog, with the marketplace metacatalog, the product information comprising information regarding a product associated with the electronic marketplace;
   instructions for facilitating completion of a transaction involving a second client using the marketplace metacatalog; and
   instructions for retiring the electronic marketplace, including:
      copying the marketplace metacatalog and any catalog binders associated with the marketplace metacatalog to a second marketplace; and
      archiving the marketplace metacatalog, the any catalog binders, and any transactions that occurred through the electronic marketplace;
   wherein the instructions for associating the product information with the marketplace metacatalog comprise:
      instructions for creating a catalog binder;
      instructions for storing a reference to the externally stored product information in the catalog binder; and
      instructions for storing a reference to the catalog binder in the marketplace metacatalog.

7. A system according to claim 6, further comprising instructions for communicating at least a portion of the product information to the second client using the marketplace metacatalog.

8. A system according to claim 6, wherein associating product information with the marketplace metacatalog comprises at least one of:
- storing the product information in the marketplace metacatalog; and
- storing a product information pointer in the marketplace metacatalog, the product information pointer comprising a pointer to the product information stored external to the marketplace metacatalog.

9. A system according to claim 6, further comprising instructions for receiving a request to access the electronic marketplace from the second client; and
- wherein communicating at least a portion of the product information to the second client comprises communicating at least a portion of the product information to the second client in response to the request.

10. A system for creating an electronic marketplace, comprising:
- a communications interface configured to receive from a first client a request to create an electronic marketplace;
- a processor communicatively coupled to the communications interface and configured to execute instructions to create a marketplace metacatalog associated with the electronic marketplace using a template and associate product information with the marketplace metacatalog, the product information comprising information regarding a product associated with the electronic marketplace;
- a storage device communicatively coupled to the processor and configured to store the marketplace metacatalog; and
- a transaction engine configured to facilitate completion of a transaction involving a second client using the marketplace metacatalog;
- wherein the processor is further configured to execute instructions to retire the electronic marketplace, including:
  - copying the marketplace metacatalog and any catalog binders associated with the marketplace metacatalog to a second marketplace; and
  - archiving the marketplace metacatalog, said any catalog binders, and any transactions that occurred through the electronic marketplace.

11. A system according to claim 10, further comprising:
- receiving data comprising at least one of the product information and a reference to the product information stored external to the marketplace metacatalog; and
- wherein associating the product information with the marketplace metacatalog comprises:
  - if the received data comprises the product information, storing the received product information in the marketplace metacatalog; and
  - if the received data comprises a reference to the product information stored external to the marketplace metacatalog, storing the reference to the product information in the marketplace metacatalog.

12. A system according to claim 10, wherein:
- the product information is stored external to the marketplace metacatalog; and
- associating the product information with the marketplace metacatalog comprises:
  - creating a catalog binder;
  - storing a reference to the externally stored product information in the catalog binder; and
  - storing a reference to the catalog binder in the marketplace metacatalog.

13. A method for creating an electronic marketplace, comprising:
- receiving from a first client a request to create an electronic marketplace;
- creating a marketplace metacatalog associated with the electronic marketplace using a template;
- identifying product information stored external to the marketplace metacatalog, the product information comprising information regarding a product associated with the electronic marketplace;
- associating the product information with the marketplace metacatalog, including:
  - creating a catalog binder;
  - storing a reference to the externally stored product information in the catalog binder; and
  - storing a reference to the catalog binder in the marketplace metacatalog; and
- enabling the first client to access the marketplace metacatalog and the associated product information.

14. A method according to claim 13, further comprising facilitating completion of a transaction involving a second client using the marketplace metacatalog.

* * * * *